United States Patent
Lee et al.

(10) Patent No.: US 11,220,294 B2
(45) Date of Patent: Jan. 11, 2022

(54) TUNNEL STRUCTURE FOR VEHICLE

(71) Applicants: HYUNDAI MOTOR COMPANY, Seoul (KR); KIA MOTORS CORPORATION, Seoul (KR)

(72) Inventors: Byeong Cheon Lee, Seoul (KR); Hee Seouk Chung, Hwaseong-si (KR); Hyun Sik Kim, Seoul (KR); Deok Hwa Hong, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 168 days.

(21) Appl. No.: 16/574,888

(22) Filed: Sep. 18, 2019

(65) Prior Publication Data
US 2020/0180698 A1   Jun. 11, 2020

(30) Foreign Application Priority Data
Dec. 5, 2018 (KR) .......................... 10-2018-0155473

(51) Int. Cl.
*B62D 21/15* (2006.01)
*B62D 25/20* (2006.01)
*B62D 21/03* (2006.01)

(52) U.S. Cl.
CPC ............. *B62D 21/15* (2013.01); *B62D 21/03* (2013.01); *B62D 25/20* (2013.01)

(58) Field of Classification Search
CPC ......... B62D 21/15; B62D 21/03; B62D 25/20

USPC .......................................................... 296/204
See application file for complete search history.

(56) References Cited

U.S. PATENT DOCUMENTS

| 6,007,145 A * | 12/1999 | Tezuka ................... B62D 25/20 |
| | | 296/203.01 |
| 6,595,581 B2 | 7/2003 | Wolkersdorfer et al. |
| 2017/0112729 A1* | 4/2017 | Cajan ..................... A61K 8/345 |
| 2017/0113729 A1 | 4/2017 | Onishi |

FOREIGN PATENT DOCUMENTS

KR    10-1844250 B    4/2018

* cited by examiner

*Primary Examiner* — D Glenn Dayoan
*Assistant Examiner* — Dana D Ivey
(74) *Attorney, Agent, or Firm* — Lempia Summerfield Katz LLC

(57) ABSTRACT

A tunnel structure for a vehicle is provided, and the tunnel structure includes a tunnel extending along a centerline of a center floor, and a plurality of crossmembers individually coupled to both side surfaces of the tunnel. Each crossmember has a closed cross-sectional shape. The tunnel structure further includes a plurality of bosses provided on the side surfaces of the tunnel, and an end portion of each crossmember received in and coupled to each boss. In addition, the tunnel includes a front tunnel disposed on a front of the center floor, a rear tunnel disposed on a rear of the center floor, and a center tunnel disposed between the front tunnel and the rear tunnel along the centerline of the center floor.

13 Claims, 14 Drawing Sheets

TUNNEL STRUCTURE FOR VEHICLE

CROSS-REFERENCE TO RELATED APPLICATION

This application claims priority to and benefit of Korean Patent Application No. 10-2018-0155473, filed on Dec. 5, 2018, which is incorporated herein by reference in its entirety.

FIELD

The present disclosure relates to a floor structure for a vehicle, and more particularly, to a tunnel structure along a centerline of the floor in the vehicle.

BACKGROUND

The statements in this section merely provide background information related to the present disclosure and may not constitute prior art.

A vehicle includes a tunnel structure in which a tunnel is coupled along a centerline of a floor. The tunnel may be connected to a center console, and wiring, a coolant conduit, and the like, and may be disposed inside the tunnel. A vehicle equipped with an internal combustion engine may be configured to allow a propeller shaft, an exhaust conduit, and the like to pass through the tunnel along the centerline of the floor.

A conventional tunnel structure is configured such that a tunnel produced by pressing may be coupled to a floor by welding, using reinforcing members, and/or the like.

The internal combustion engine vehicle is configured to have the propeller shaft disposed inside the tunnel in a longitudinal direction of the tunnel, thereby reinforcing the stiffness or strength against side collisions.

However, we have discovered that an electric vehicle is configured such that the propeller shaft is not disposed inside the tunnel, and thus the stiffness of the tunnel may be weak for reinforcing stiffness or strength. In addition, it may be difficult to appropriately cope with the side collisions.

Meanwhile, a crossmember may be coupled to the tunnel, and a vehicle seat may be mounted on the crossmember. In particular, a joint region between the tunnel and the crossmember is an important portion directly affecting side crashworthiness and the stiffness of a vehicle body. We have discovered that when the strength of the joint region between the tunnel and the crossmember is lowered, the overall stiffness of the vehicle body such as bending stiffness and torsional stiffness may be lowered.

In addition, we have further discovered that if the tunnel is a cast product produced by casting, it may be difficult to perform welding on the tunnel in various directions and add separate components to the tunnel.

The above information disclosed in this Background section is only for enhancement of understanding of the background of the present disclosure, and therefore it may contain information that does not form the prior art that is already known to a person of ordinary skill in the art.

SUMMARY

The present disclosure provides a tunnel structure for a vehicle capable of reinforcing a coupling strength between a tunnel and a crossmember, thereby enhancing stiffness of a vehicle body and improving crashworthiness.

According to an aspect of the present disclosure, a tunnel structure for a vehicle may include a tunnel extending along a centerline of a center floor, and a plurality of crossmembers individually coupled to both side surfaces of the tunnel. Each crossmember may have a closed cross-sectional shape. The tunnel structure further includes a plurality of bosses provided on the side surfaces of the tunnel, and an end portion of each crossmember being received in and coupled to each boss.

The boss may have a cavity in which the end portion of the crossmember is received.

According to a further aspect of the present disclosure, the tunnel may include a front tunnel disposed on a front of the center floor, a rear tunnel disposed on a rear of the center floor, and a center tunnel disposed between the front tunnel and the rear tunnel.

The boss may be provided on a side wall of the center tunnel.

According to a further aspect of the present disclosure, the boss may include an upper wall by which an upper portion of the cavity is closed, a front wall by which a front of the cavity is closed, a rear wall by which a rear of the cavity is closed, and a support wall by which an interior of the cavity is closed.

The support wall may extend from a side wall of the center tunnel.

The upper wall of the boss may contact an upper surface of the crossmember, the front wall of the boss may contact a front surface of the crossmember, the rear wall of the boss may contact a rear surface of the crossmember, and the support wall of the boss may contact an end surface of the crossmember.

According to a further aspect of the present disclosure, the center tunnel may have a plurality of reinforcing ribs on an interior surface thereof, and the plurality of reinforcing ribs may include a plurality of first ribs extending in a width direction of the center tunnel, and a plurality of second ribs extending in a longitudinal direction of the center tunnel.

The plurality of first ribs and the plurality of second ribs may intersect each other.

According to a further aspect of the present disclosure, the rear tunnel may have a reinforcement part having a closed cross-sectional shape.

According to a further aspect of the present disclosure, the center tunnel may have a rear reinforcing rib having the same cross-sectional shape as that of the reinforcement part of the rear tunnel, the rear reinforcing rib may be disposed at a rear end of the center tunnel, and a front end of the reinforcement part of the rear tunnel may be supported by the rear reinforcing rib of the center tunnel.

According to a further aspect of the present disclosure, a rear end of the rear tunnel may be coupled to a rear floor, the rear floor may have a floor reinforcement part having the same cross-sectional shape as that of the reinforcement part of the rear tunnel, and a rear end of the reinforcement part of the rear tunnel may be supported by the floor reinforcement part of the rear floor.

According to another aspect of the present disclosure, a tunnel structure for a vehicle may include a tunnel extending along a centerline of a center floor, and a member coupled to a side wall of the tunnel and having a closed cross-sectional shape. In addition, the tunnel may have a support wall supporting an end portion of the member, the member may have at least one reinforcing rib, and the reinforcing rib may extend in a longitudinal direction of the member.

According to a further aspect of the present disclosure, the support wall may have at least one support rib, and the support rib may be parallel to the reinforcing rib of the member.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
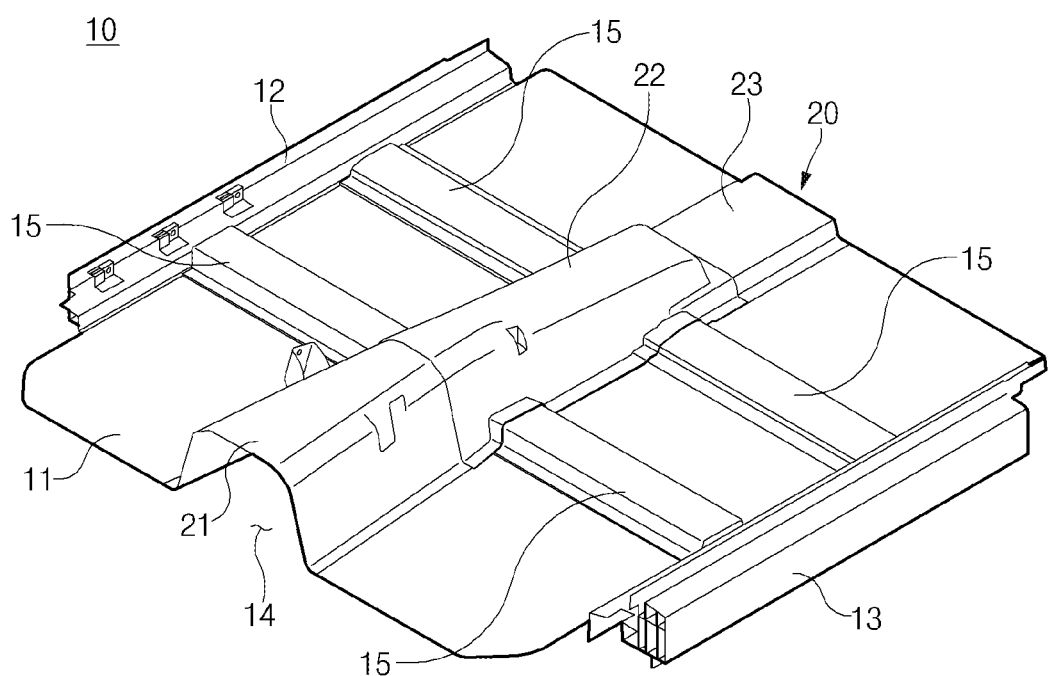
FIG. 1 illustrates a perspective view of a tunnel structure for a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
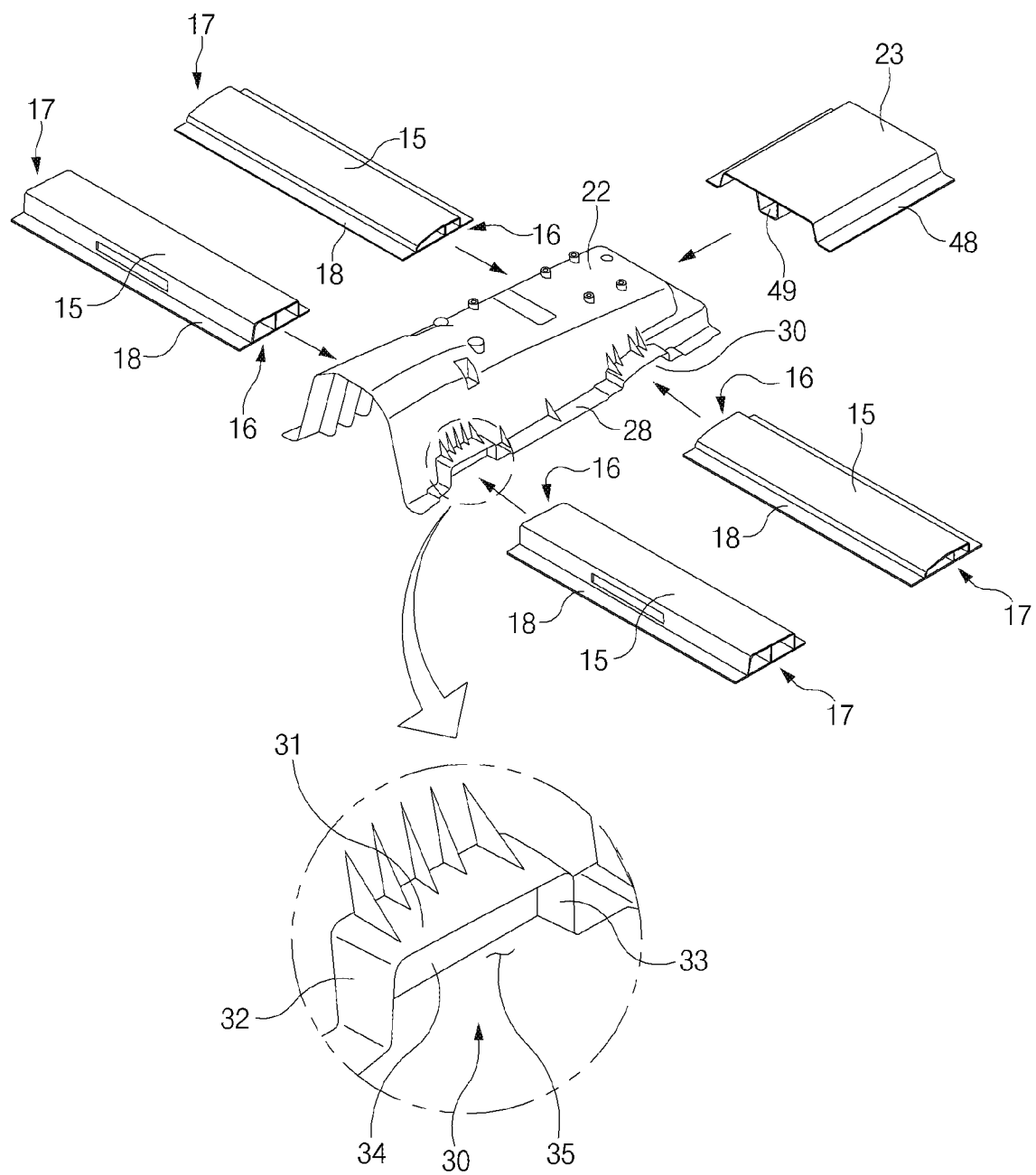
FIG. 2 illustrates an exploded perspective view of a tunnel and a crossmember in a tunnel structure for a vehicle according to an exemplary form of the present disclosure.

Referring to FIGS. 1 and 2, a tunnel structure 10 for a vehicle according to an exemplary form of the present disclosure may include a tunnel 20 disposed along a centerline of a center floor 11, and a plurality of crossmembers 15 individually coupled to both side surfaces of the tunnel 20.

According to an exemplary form, the center floor 11 may be a floor disposed between two side sills 12 and 13.

The center floor 11 may have an opening 14 extending along the centerline. The tunnel 20 may cover the opening 14 of the center floor 11 so that an interior space of the tunnel 20 may communicate with the opening 14.

Referring to FIGS. 1 and 2, the plurality of crossmembers 15 may be coupled to an upper surface of the center floor 11. Each crossmember 15 may extend in a width direction of the center floor 11 (that is, a width direction of the vehicle). The crossmember 15 may have a first end portion 16 coupled to the tunnel 20, and a second end portion 17 coupled to the side sill 12 or 13.

As illustrated in FIG. 2, the crossmember 15 may have two flanges 18 extending along front and rear edges thereof. Each flange 18 may have a shape corresponding to the upper surface of the center floor 11, and may be coupled to the center floor 11 by welding, using fasteners, and/or the like.

Figure 5:
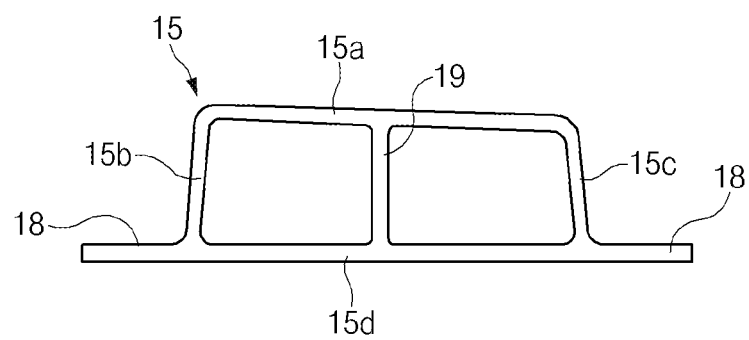
FIG. 5 illustrates a side view of a crossmember in a tunnel structure for a vehicle according to an exemplary form of the present disclosure.

As illustrated in FIG. 5, the crossmember 15 may have a closed cross-sectional shape such as a hollow rectangular cross-sectional shape. According to an exemplary form, since the crossmember 15 has the same cross section in a longitudinal direction thereof, it may be produced by an extrusion process or a drawing process.

For example, as illustrated in FIG. 5, the crossmember 15 may have a closed cross-sectional shape having an upper wall 15a facing the upper part of the vehicle, a front wall 15b facing the front of the vehicle, a rear wall 15c facing the rear of the vehicle, and a bottom wall 15d contacting the center floor 11 of the vehicle.

As illustrated in FIGS. 1 and 2, the tunnel 20 may include a front tunnel 21 disposed on the front of the center floor 11, a rear tunnel 23 disposed on the rear of the center floor 11, and a center tunnel 22 disposed between the front tunnel 21 and the rear tunnel 23.

The front tunnel 21 may be disposed on the front of the center floor 11. According to an exemplary form, the front tunnel 21 may be produced by forging, casting, pressing, or the like, and may be coupled to the front of the center floor 11 by welding and/or using fasteners. According to another exemplary form, the front tunnel 21 may be integrally formed with the front of the center floor 11 by forging, pressing, or the like, so that the front tunnel 21 and the center floor 11 may be formed as a unitary one-piece. The bottom of the front tunnel 21 may be open.

The center tunnel 22 may be disposed on the rear of the front tunnel 21, and the center tunnel 22 may be a separate component with respect to the center floor 11. For example, the center tunnel 22 may be an aluminum cast product which is produced by casting an aluminum material. A front end of the center tunnel 22 may be coupled to a rear end of the front tunnel 21 by welding, using fasteners, and/or the like. For example, the rear end of the front tunnel 21 may be inserted so as to overlap the front end of the center tunnel 22. When the rear end of the front tunnel 21 is inserted into the front end of the center tunnel 22, an overlapped portion between the rear end of the front tunnel 21 and the front end of the center tunnel 22 may be coupled by welding and/or using fasteners. Thus, the front tunnel 21 and the center tunnel 22 may be connected to be aligned along a longitudinal direction of the center floor 11.

Figure 3:
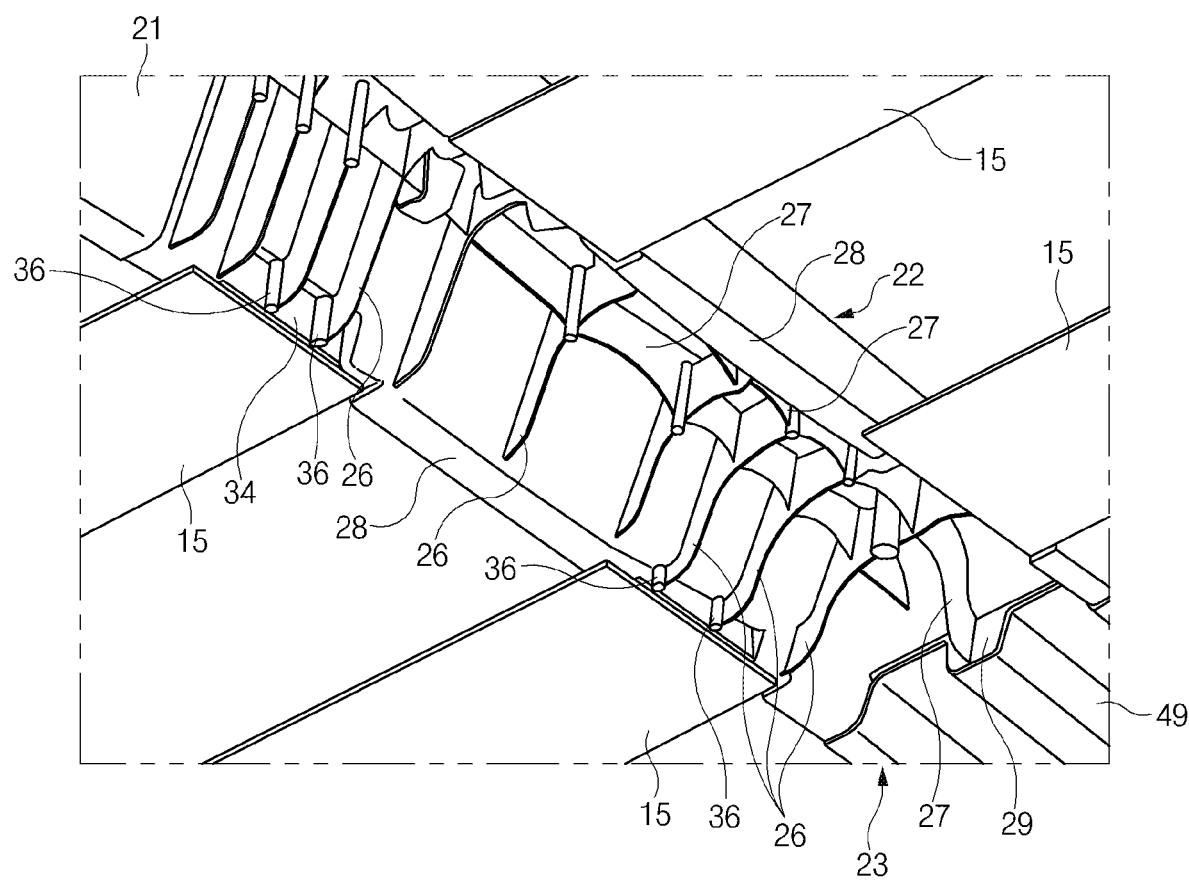
FIG. 3 illustrates a bottom perspective view of a tunnel and a crossmember in a tunnel structure for a vehicle according to an exemplary form of the present disclosure.
Figure 10:
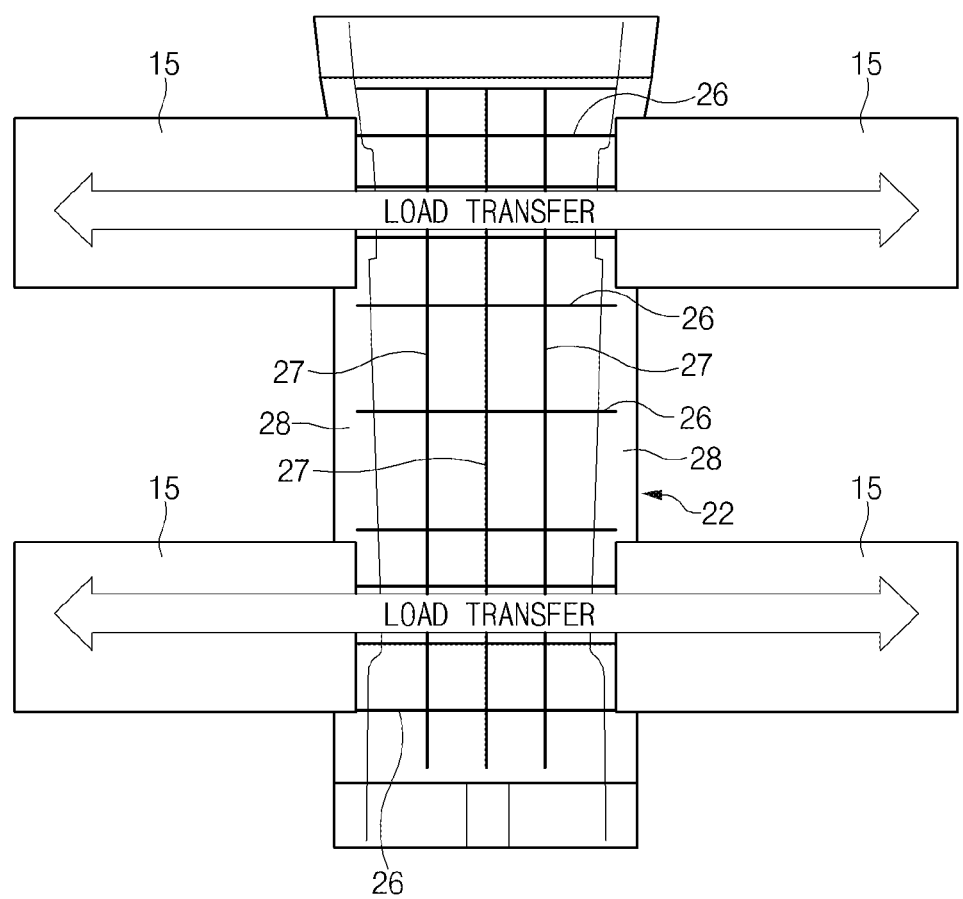
FIG. 10 illustrates a bottom view of a tunnel structure for a vehicle according to an exemplary form of the present disclosure.

Referring to FIGS. 3 and 10, the center tunnel 22 may have a plurality of reinforcing ribs 26 and 27 formed on an interior surface thereof, and the plurality of reinforcing ribs 26 and 27 may include a plurality of first ribs 26 extending in a width direction of the center tunnel 22, and a plurality of second ribs 27 extending in a longitudinal direction of the center tunnel 22. The plurality of first ribs 26 and the plurality of second ribs 27 may intersect each other, so that a load transferred to the center tunnel 22 may be smoothly transferred along the width direction and the longitudinal direction of the center tunnel 22.

The center tunnel 22 may have two flanges 28 extending along both edges thereof. Each flange 28 may have a shape corresponding to the upper surface of the center floor 11, and may be coupled to the center floor 11 by welding and/or using fasteners.

Referring back to FIG. 2, the center tunnel 22 may include a plurality of bosses 30 projecting from both edges thereof. Each boss 30 may have a cavity 35 in which the first end portion 16 of the crossmember 15 is received. An end surface 16a of the first end portion 16 of the crossmember 15 may be coupled to the boss 30 by welding and/or using fasteners.

The boss 30 may be provided on a bottom edge of each side wall of the center tunnel 22 to be continuously connected to the flange 28.

Figure 4:
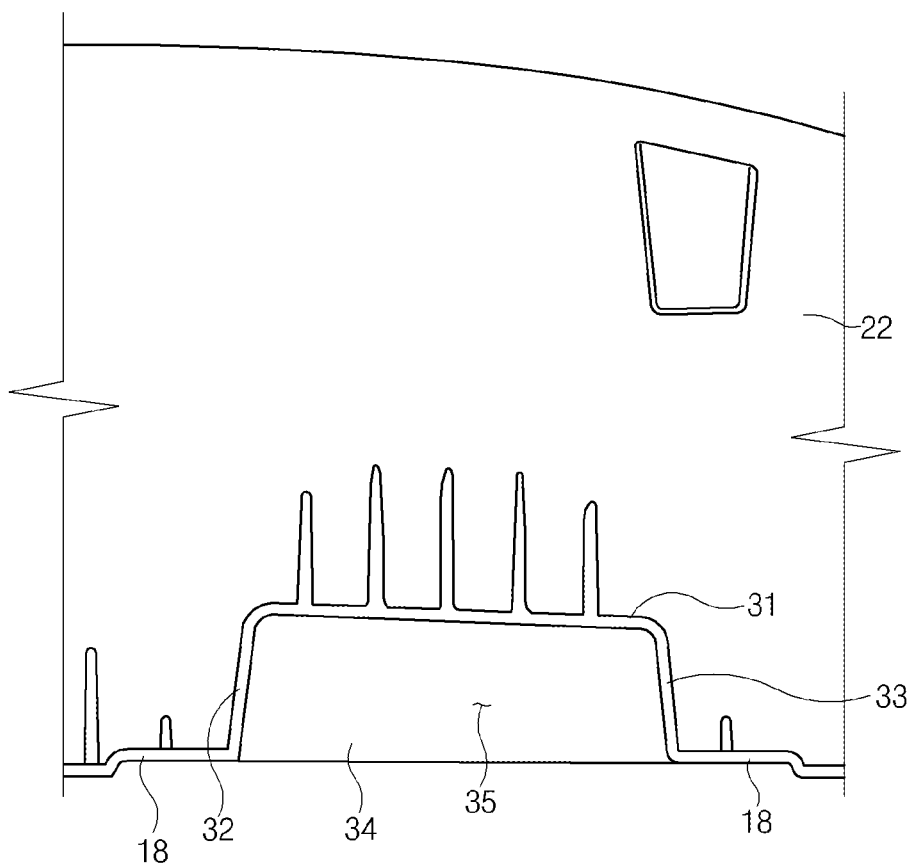
FIG. 4 illustrates a side view of a center tunnel in a tunnel structure for a vehicle according to an exemplary form of the present disclosure.

According to an exemplary form, as illustrated in FIGS. 2 and 4, the boss 30 may include an upper wall 31 facing the upper part of the vehicle, a front wall 32 facing the front of the vehicle, a rear wall 33 facing the rear of the vehicle, and a support wall 34 facing a centerline of the vehicle.

The front wall 32 may be disposed on the front of the upper wall 31, and the rear wall 33 may be disposed on the rear of the upper wall 31. The support wall 34 may extend from the side wall of the center tunnel 22. The upper wall 31, the front wall 32, the rear wall 33, and the support wall 34 may define the cavity 35 receiving the first end portion 16 of the crossmember 15.

The upper wall 31 may close an upper portion of the cavity 35, thereby defining an upper surface of the cavity 35. The upper wall 31 may have a shape corresponding to an upper surface of the crossmember 15 so that the upper surface of the crossmember 15 may contact the upper wall 31 of the boss 30. For example, if the upper surface of the crossmember 15 is flat, the upper wall 31 may be flat. If the upper surface of the crossmember 15 is inclined, the upper wall 31 may be inclined.

The front wall 32 may close the front of the cavity 35, thereby defining a front surface of the cavity 35. The front wall 32, which is a portion facing the front of the vehicle, may have a shape corresponding to a front surface of the crossmember 15. Thus, the front surface of the crossmember 15 may tightly contact the front wall 32. For example, if the front surface of the crossmember 15 is vertically flat, the front wall 32 may extend vertically flat. If the front surface of the crossmember 15 is inclined, the front wall 32 may extend in an inclined direction.

The rear wall 33 may close the rear of the cavity 35, thereby defining a rear surface of the cavity 35. The rear wall 33, which is a portion facing the rear of the vehicle, may have a shape corresponding to a rear surface of the crossmember 15. Thus, the rear surface of the crossmember 15 may tightly contact the rear wall 33. For example, if the rear surface of the crossmember 15 is vertically flat, the rear wall 33 may extend vertically flat. If the rear surface of the crossmember 15 is inclined, the rear wall 33 may extend in an inclined direction.

The support wall 34 may close the interior of the cavity 35, thereby defining an interior surface of the cavity 35. According to an exemplary form, the support wall 34 may have a shape corresponding to the end surface 16a of the first end portion 16 of the crossmember 15. Thus, the end surface 16a of the first end portion 16 of the crossmember 15 may tightly contact the support wall 34.

According to another exemplary form, only the support wall 34 may be formed on the side wall of the center tunnel 22, and the upper wall 31, the front wall 32, and the rear wall 33 of the boss 30 may be removed. The end surface 16a of the first end portion 16 of the crossmember 15 may be coupled to the support wall 34 by butt welding or the like.

Figure 6:
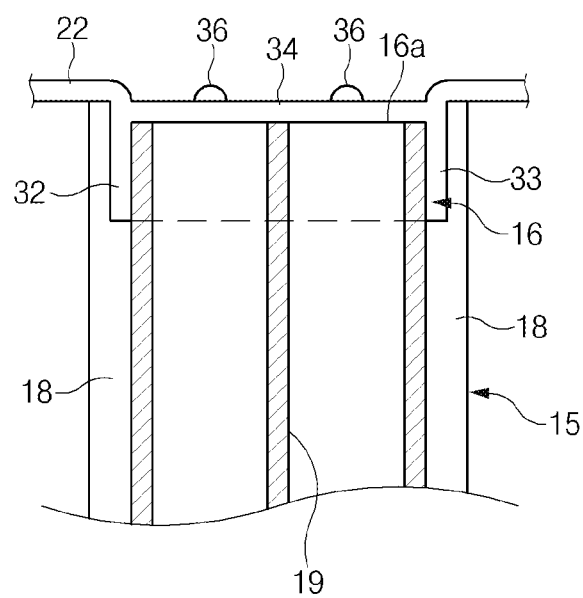
FIG. 6 illustrates a plan sectional view of a coupling structure of a boss and a crossmember in a tunnel structure for a vehicle according to an exemplary form of the present disclosure.
Figure 7:
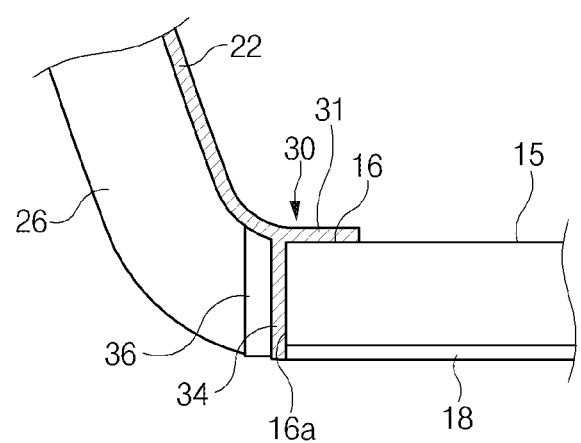
FIG. 7 illustrates a front sectional view of a coupling structure of a boss and a crossmember in a tunnel structure for a vehicle according to an exemplary form of the present disclosure.
Figure 8:
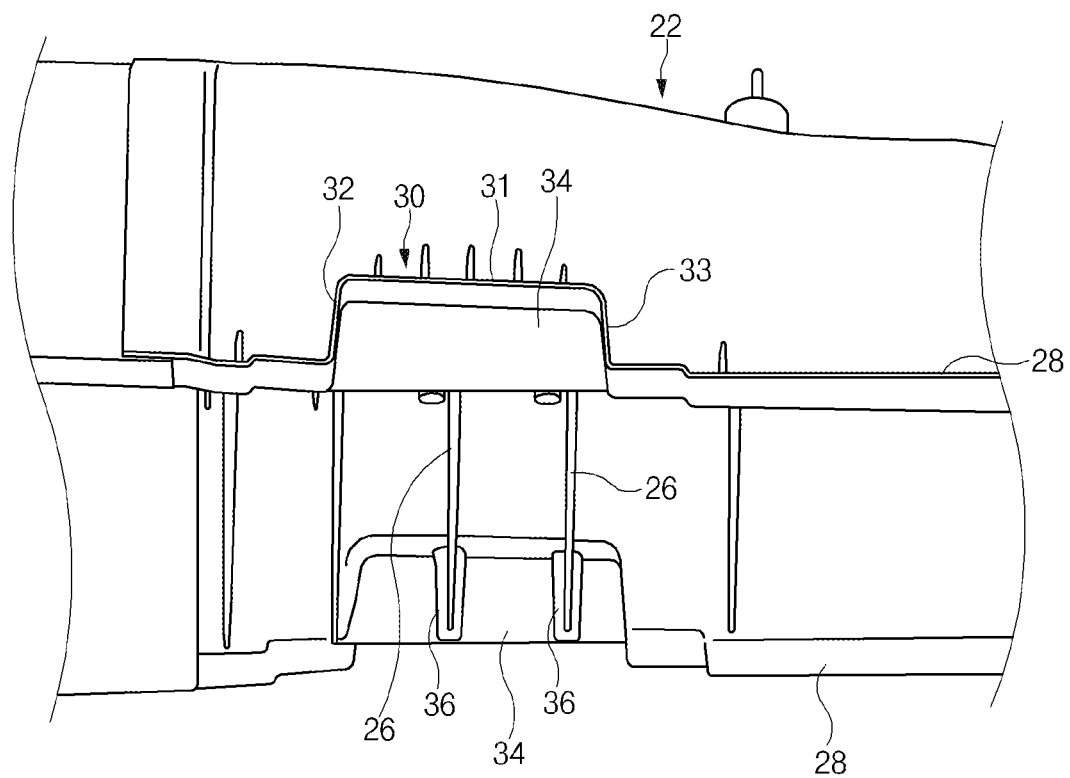
FIG. 8 illustrates a bottom perspective view of a center tunnel in a tunnel structure for a vehicle according to an exemplary form of the present disclosure.
Figure 9:
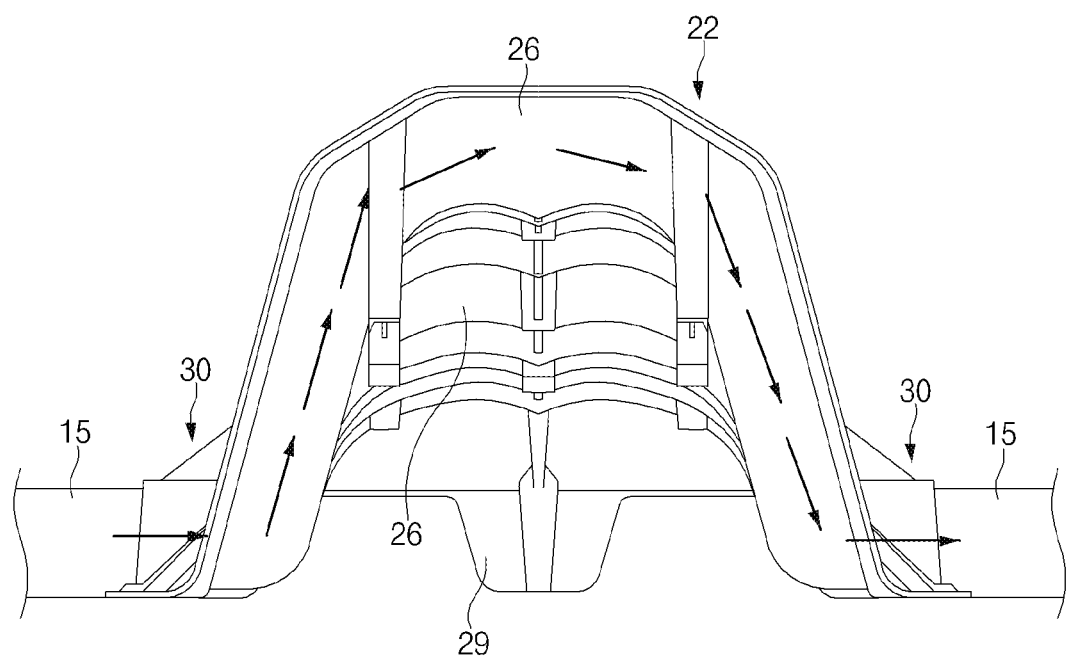
FIG. 9 illustrates a front sectional view of a tunnel structure for a vehicle according to an exemplary form of the present disclosure.

According to an exemplary form, as illustrated in FIGS. 6 to 8, the support wall 34 may have one or more support ribs 36 formed on the interior surface thereof, and the interior surface of the support wall 34 may be a surface facing the interior space of the center tunnel 22. Each support rib 36 of the support wall 34 may continuously extend from the first rib 26 of the center tunnel 22. Thus, as illustrated in FIGS. 9 and 10, a load path through which a load is transferred between the center tunnel 22 and the crossmember 15 may be sufficiently secured.

According to an exemplary form, as illustrated in FIG. 6, the support rib 36 may be parallel to a reinforcing rib 19 of the crossmember 15. That is, the support rib 36 may extend in a direction which is the same as an extrusion direction of the crossmember 15. As the support rib 36 is parallel to the reinforcing rib 19 of the crossmember 15, the load path between the crossmember 15 and the center tunnel 22 may be stably established as illustrated in FIGS. 9 and 10.

Figure 6A:
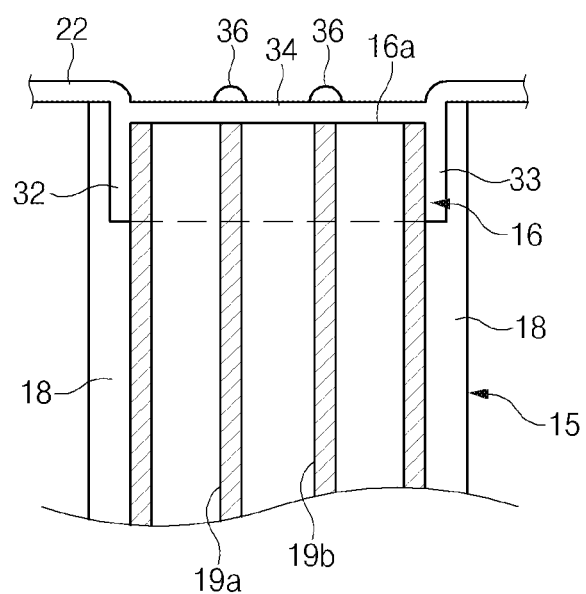
FIG. 6A illustrates a plan sectional view according to a modified form of FIG. 6.

According to an exemplary form, the support rib 36 may be flush with the reinforcing rib 19 of the crossmember 15. As illustrated in FIG. 6A, when the support wall 34 of the boss 30 has two support ribs 36, and the crossmember 15 has two reinforcing ribs 19a and 19b, the support ribs 36 of the support wall 34 may be flush with the reinforcing ribs 19a and 19b of the crossmember 15, respectively.

According to the above-described exemplary forms, the first end portion 16 of the crossmember 15 may be received in the cavity 35 of the boss 30, and the first end portion 16 of the crossmember 15 may be coupled to the boss 30 by welding and/or the like, so that a coupling strength between the crossmember 15 and the center tunnel 22 may be significantly reinforced. Thus, the overall stiffness of a vehicle body may be enhanced, and crashworthiness may be significantly improved.

Referring back to FIG. 2, a bottom end of the front wall 32 and a bottom end of the rear wall 33 may be directly connected to the flange 28 of the center tunnel 22 so that the boss 30 may be continuously connected to the flange 28 of the center tunnel 22. As the boss 30 is continuously connected to the flange 28 of the center tunnel 22, support stiffness with respect to the boss 30 may be secured, and the overall stiffness of the center tunnel 22 may be reinforced.

The center tunnel 22 may be disposed on the rear of the front tunnel 21, and the center tunnel 22 may be a separate component with respect to the center floor 11. For example, the center tunnel 22 may be a cast product which is produced by a casting process. The front end of the center tunnel 22 may be coupled to the rear end of the front tunnel 21 by welding, using fasteners, and/or the like. For example, the rear end of the front tunnel 21 may be inserted so as to overlap the front end of the center tunnel 22. When the rear end of the front tunnel 21 is inserted into the front end of the center tunnel 22, the overlapped portion between the rear end of the front tunnel 21 and the front end of the center tunnel 22 may be coupled by welding and/or using fasteners.

The rear tunnel 23 may be disposed on the rear of the center tunnel 22, and the rear tunnel 23 may be a separate component with respect to the center floor 11. A front end of the rear tunnel 23 may be coupled to a rear end of the center tunnel 22 by welding, using fasteners, and/or the like. For example, the front end of the rear tunnel 23 may be inserted so as to overlap the rear end of the center tunnel 22. When the front end of the rear tunnel 23 is inserted into the rear end of the center tunnel 22, an overlapped portion between the rear end of the center tunnel 22 and the front end of the rear tunnel 23 may be coupled by welding and/or using fasteners. Thus, the center tunnel 22 and the rear tunnel 23 may be connected to be aligned along the longitudinal direction of the center floor 11.

Figure 12:
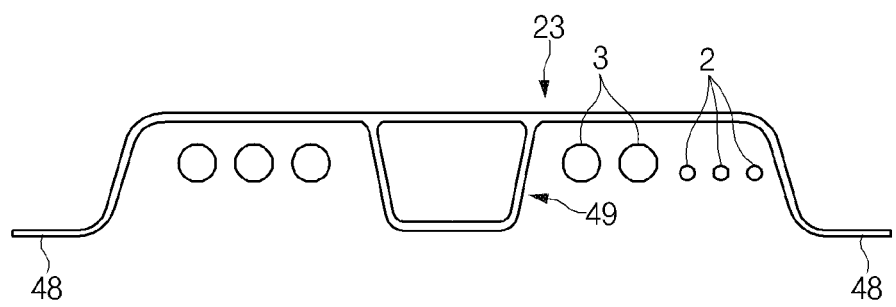
FIG. 12 illustrates a front view of a rear tunnel in a tunnel structure for a vehicle according to an exemplary form of the present disclosure.

Referring to FIG. 12, the rear tunnel 23 may have two flanges 48 extending along both edges thereof. Each flange 48 may have a shape corresponding to the upper surface of the center floor 11, and may extend in a longitudinal direction of the rear tunnel 23. The flange 48 may be coupled to the center floor 11 by welding and/or using fasteners.

The rear tunnel 23 may not have a closed cross-sectional shape since wiring 2, a cooling hose 3, and the like pass through the rear tunnel 23. Accordingly, the rear tunnel 23 may have at least one reinforcement part 49 to secure battery mounting and stiffness. The reinforcement part 49 may be formed on an inner centerline of the rear tunnel 23, and extend in the longitudinal direction of the rear tunnel 23. The reinforcement part 49 may have a closed cross-sectional shape such as a hollow rectangular cross-sectional shape. For example, since the rear tunnel 23 has the same cross section in the longitudinal direction thereof, it may be produced by an extrusion process or a drawing process.

Figure 11:
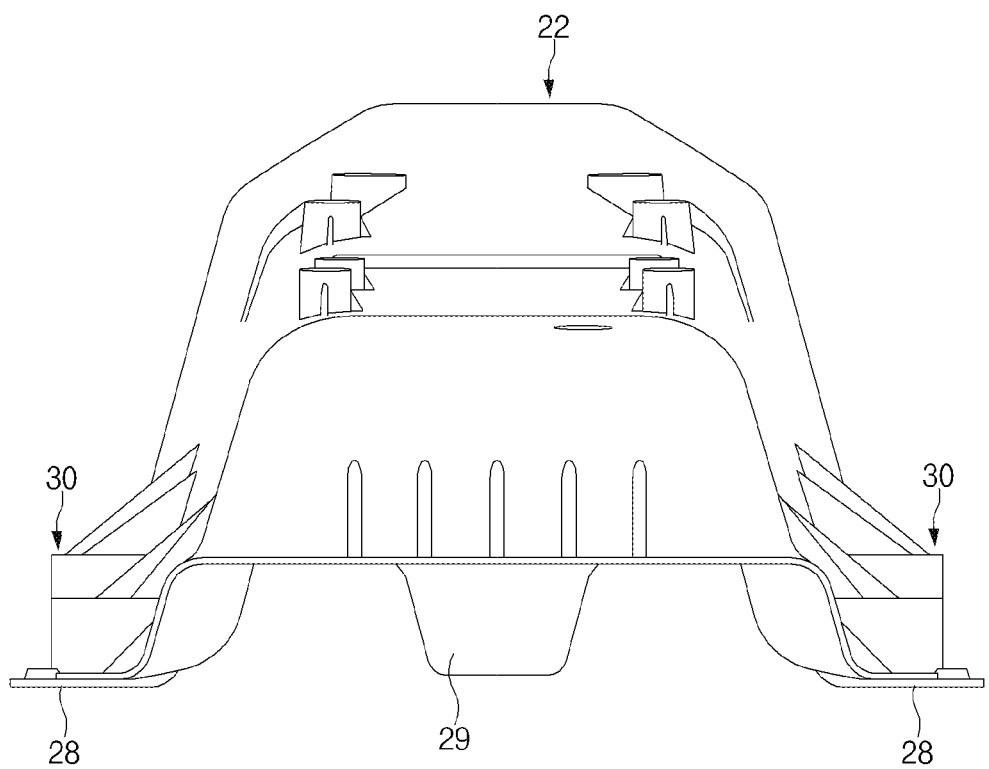
FIG. 11 illustrates a rear view of a center tunnel in a tunnel structure for a vehicle according to an exemplary form of the present disclosure.

Referring to FIG. 11, the center tunnel 22 may have a rear reinforcing rib 29 formed at the rear end thereof. The rear reinforcing rib 29 may have the same shape as the closed cross-sectional shape of the reinforcement part 49 of the rear tunnel 23. The rear reinforcing rib 29 may be integrally formed with an end of the second rib 27 extending in the centerline of the center tunnel 22. The rear reinforcing rib 29 of the center tunnel 22 may contact or be coupled to a front end of the reinforcement part 49 of the rear tunnel 23 so that the front end of the reinforcement part 49 of the rear tunnel 23 may be firmly supported by the rear reinforcing rib 29 of the center tunnel 22.

Figure 13:
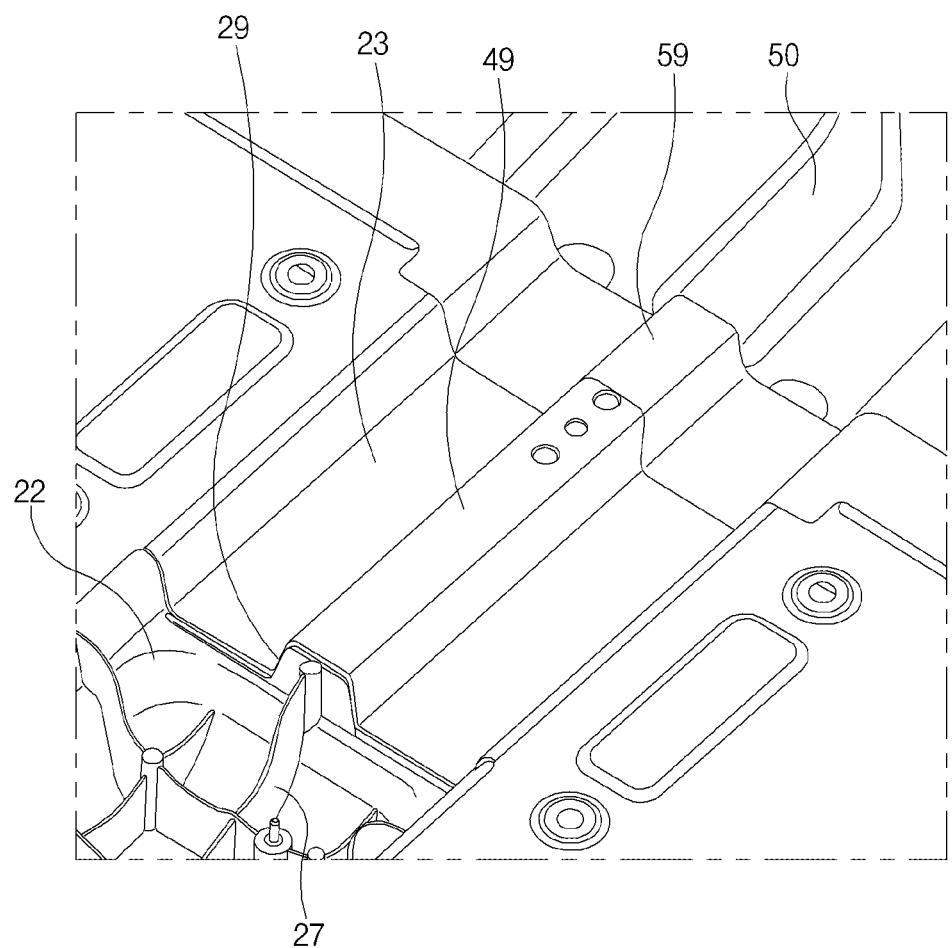
FIG. 13 illustrates a perspective view of a bottom of a rear tunnel in a tunnel structure for a vehicle according to an exemplary form of the present disclosure.

In addition, referring to FIG. 13, the rear end of the rear tunnel 23 may be coupled to a rear floor 50. In particular, the rear floor 50 may have a floor reinforcement part 59 connected to a rear end of the reinforcement part 49 of the rear tunnel 23, and the floor reinforcement part 59 of the rear floor 50 may have the same cross-sectional shape as that of the reinforcement part 49 of the rear tunnel 23. The floor reinforcement part 59 of the rear floor 50 may contact or be coupled to the rear end of the reinforcement part 49 of the rear tunnel 23 so that the rear end of the reinforcement part 49 of the rear tunnel 23 may be firmly supported by the floor reinforcement part 59 of the rear floor 50.

The reinforcement part 49 of the rear tunnel 23 may be supported by the rear reinforcing rib 29 of the center tunnel 22 and the floor reinforcement part 59 of the rear floor 50 in opposite front and rear directions so that the overall stiffness of the vehicle body may be increased.

As set forth above, the tunnel structure according to exemplary forms of the present disclosure may be configured such that the tunnel may have the boss projecting from the side wall thereof, and the end portion of the crossmember may be received in and coupled to the boss of the tunnel, thereby reinforcing a coupling strength between the tunnel and the crossmember to enhance the overall stiffness of the vehicle body, improve crashworthiness, and contribute to bending stiffness and torsional stiffness of the vehicle body.

In addition, the rear tunnel having the reinforcement part may be coupled to the center tunnel of the tunnel, and the reinforcement part of the rear tunnel may be supported by the rear reinforcing rib of the center tunnel and the floor reinforcement part of the rear floor in the opposite front and rear directions so that the overall stiffness of the vehicle body may be increased.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present.

What is claimed is:

1. A tunnel structure for a vehicle, the tunnel structure comprising:
   a tunnel extending along a centerline of a center floor;
   a plurality of crossmembers individually coupled to both side surfaces of the tunnel, each crossmember having a closed cross-sectional shape;
   a plurality of bosses provided on the side surfaces of the tunnel; and
   an end portion of each crossmember being received in and coupled to each boss,
   wherein:
      the boss has a cavity in which the end portion of the crossmember is received, and
      the boss includes an upper wall by which an upper portion of the cavity is closed, a front wall by which a front of the cavity is closed, a rear wall by which a rear of the cavity is closed, and a support wall by which an interior of the cavity is closed.

2. The tunnel structure according to claim 1, wherein the tunnel includes a front tunnel disposed on a front of the center floor, a rear tunnel disposed on a rear of the center floor, and a center tunnel disposed between the front tunnel and the rear tunnel.

3. The tunnel structure according to claim 2, wherein the boss is provided on a side wall of the center tunnel.

4. The tunnel structure according to claim 2, wherein the center tunnel has a plurality of reinforcing ribs on an interior surface thereof, and the plurality of reinforcing ribs include a plurality of first ribs extending in a width direction of the center tunnel, and a plurality of second ribs extending in a longitudinal direction of the center tunnel.

5. The tunnel structure according to claim 4, wherein the plurality of first ribs and the plurality of second ribs intersect each other.

6. The tunnel structure according to claim 2, wherein the rear tunnel has a reinforcement part having a closed cross-sectional shape.

7. The tunnel structure according to claim 6, wherein the center tunnel has a rear reinforcing rib having the same cross-sectional shape as that of the reinforcement part of the rear tunnel,
- the rear reinforcing rib is disposed at a rear end of the center tunnel, and
- a front end of the reinforcement part of the rear tunnel is supported by the rear reinforcing rib of the center tunnel.

8. The tunnel structure according to claim 6, wherein a rear end of the rear tunnel is coupled to a rear floor,
- the rear floor has a floor reinforcement part having the same cross-sectional shape as that of the reinforcement part of the rear tunnel, and
- a rear end of the reinforcement part of the rear tunnel is supported by the floor reinforcement part of the rear floor.

9. The tunnel structure according to claim 1, wherein the support wall extends from a side wall of a center tunnel of the tunnel.

10. The tunnel structure according to claim 1, wherein the upper wall of the boss contacts an upper surface of the crossmember,
- the front wall of the boss contacts a front surface of the crossmember,
- the rear wall of the boss contacts a rear surface of the crossmember, and
- the support wall of the boss contacts an end surface of the crossmember.

11. A tunnel structure for a vehicle, the tunnel structure comprising:
- a tunnel extending along a centerline of a center floor;
- a boss provided on side surfaces of the tunnel; and
- a member coupled to the boss of the tunnel, the member having a closed cross-sectional shape, wherein:
- the member has at least one reinforcing rib,
- the at least one reinforcing rib extends in a longitudinal direction of the member,
- the boss has a cavity in which an end portion of the member is received, and
- the boss includes an upper wall by which an upper portion of the cavity is closed, a front wall by which a front of the cavity is closed, a rear wall by which a rear of the cavity is closed, and a support wall by which an interior of the cavity is closed.

12. The tunnel structure according to claim 11, wherein the support wall has at least one support rib.

13. The tunnel structure according to claim 12, wherein the support rib is parallel to the at least one reinforcing rib of the member.

* * * * *